(12) United States Patent
Takakuwa

(10) Patent No.: US 10,156,668 B2
(45) Date of Patent: Dec. 18, 2018

(54) WIRE GRID POLARIZER AND METHOD OF FABRICATING THE SAME

(71) Applicant: Samsung Display Co., Ltd., Yongin (KR)

(72) Inventor: Atsushi Takakuwa, Hwaseong-si (KR)

(73) Assignee: Samsung Display Co., Ltd, Yongin (KR)

( * ) Notice: Subject to any disclaimer, the term of this patent is extended or adjusted under 35 U.S.C. 154(b) by 0 days.

(21) Appl. No.: 14/622,069

(22) Filed: Feb. 13, 2015

(65) Prior Publication Data

US 2016/0077262 A1    Mar. 17, 2016

(30) Foreign Application Priority Data

Sep. 12, 2014  (KR) .................. 10-2014-0121126

(51) Int. Cl.
  *G02B 5/30*   (2006.01)
  *G02F 1/1335*  (2006.01)

(52) U.S. Cl.
  CPC ............. *G02B 5/3058* (2013.01); *G02F 2001/133548* (2013.01)

(58) Field of Classification Search
  USPC ................................. 359/487.03
  See application file for complete search history.

(56) References Cited

U.S. PATENT DOCUMENTS

| | | | | |
|---|---|---|---|---|
| 2008/0252799 | A1* | 10/2008 | Lee ............... | G02B 5/3058 349/5 |
| 2010/0128347 | A1* | 5/2010 | Huang ............. | G02B 27/283 359/485.06 |
| 2013/0270223 | A1* | 10/2013 | Lee ............... | G03F 7/031 216/24 |
| 2013/0300986 | A1* | 11/2013 | Kang ............... | G02B 5/3058 349/96 |
| 2013/0329169 | A1* | 12/2013 | Kim ............... | G02F 1/133528 349/96 |
| 2014/0170307 | A1* | 6/2014 | Tomita ............. | G03F 7/0002 427/154 |

FOREIGN PATENT DOCUMENTS

| | | |
|---|---|---|
| JP | 2004-271558 | 9/2004 |
| JP | 2005-316495 | 11/2005 |
| KR | 10-2010-0084865 | 7/2010 |
| KR | 10-2013-0024041 | 3/2013 |
| KR | 10-2013-0052942 | 5/2013 |
| KR | 10-2014-0024510 | 3/2014 |

* cited by examiner

*Primary Examiner* — Darryl J Collins
*Assistant Examiner* — Journey Sumlar
(74) *Attorney, Agent, or Firm* — H.C. Park & Associates, PLC

(57) ABSTRACT

A method of fabricating a wire grid polarizer includes sequentially stacking a conductive wire pattern layer, a sacrificial layer, and an imprint pattern layer; patterning the imprint pattern layer; inspecting the patterned imprint pattern layer for a fault; and removing the sacrificial layer from the conductive wire pattern layer if the fault is present on the patterned imprint pattern layer.

7 Claims, 12 Drawing Sheets

WIRE GRID POLARIZER AND METHOD OF FABRICATING THE SAME

CROSS-REFERENCE TO RELATED APPLICATION

This application claims priority from and the benefit under 35 U.S.C. § 119(a) of Korean Patent Application No. 10-2014-0121126 filed on Sep. 12, 2014, the entire disclosure of which is incorporated herein by reference for all purposes.

BACKGROUND

Field

The following description relates to a wire grid polarizer and a method of fabricating the same.

Discussion of the Background

A parallel conductive wire array, in which parallel conductive lines are arranged in order to polarize specific polarized light in an electromagnetic wave, is generally referred to as a wire grid.

A wire grid structure having a shorter period than that of a wavelength of corresponding light has a polarization property of reflecting polarized light in a direction of a wire and allowing polarized light vertical to the direction of the wire to pass through for depolarized incident light. This has an advantage in that reflected polarized light is re-usable compared to an absorption-type polarizer.

However, when foreign materials, not air, flow into a space between wire patterns, polarization efficiency deteriorates, and when a material having a higher refractive index than that of air flows in, transmittance and an extinction ratio are degraded in a visual ray region.

SUMMARY

Exemplary embodiments of the present invention to provide a wire grid polarizer having an improved optical property, a display device including the same, and a method of fabricating the same.

Additional features of the invention will be set forth in the description which follows, and in part will be apparent from the description, or may be learned by practice of the invention.

Exemplary embodiments of the present invention provide a method of fabricating a wire grid polarizer including sequentially stacking a conductive wire pattern layer, a sacrificial layer, and an imprint pattern layer; patterning the imprint pattern layer; inspecting the patterned imprint pattern layer for a fault; and removing the sacrificial layer from the conductive wire pattern layer if the fault is present on the patterned imprint pattern layer.

Exemplary embodiments of the present invention provide a wire grid polarizer including a substrate, a conductive wire pattern disposed on the substrate, and a sacrificial layer pattern disposed on the conductive wire pattern, in which the sacrificial layer pattern is formed of at least one of a polyimide, an organic-inorganic hybrid material, and silicon.

Exemplary embodiments of the present invention provide a display device including a wire grid polarizer having a substrate, a plurality of parallel conductive wire patterns disposed on the substrate, and a plurality of sacrificial layer patterns disposed on the conductive wire patterns, in which the sacrificial layer patterns are formed of at least one of a polyimide, an organic-inorganic hybrid material, and silicon.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
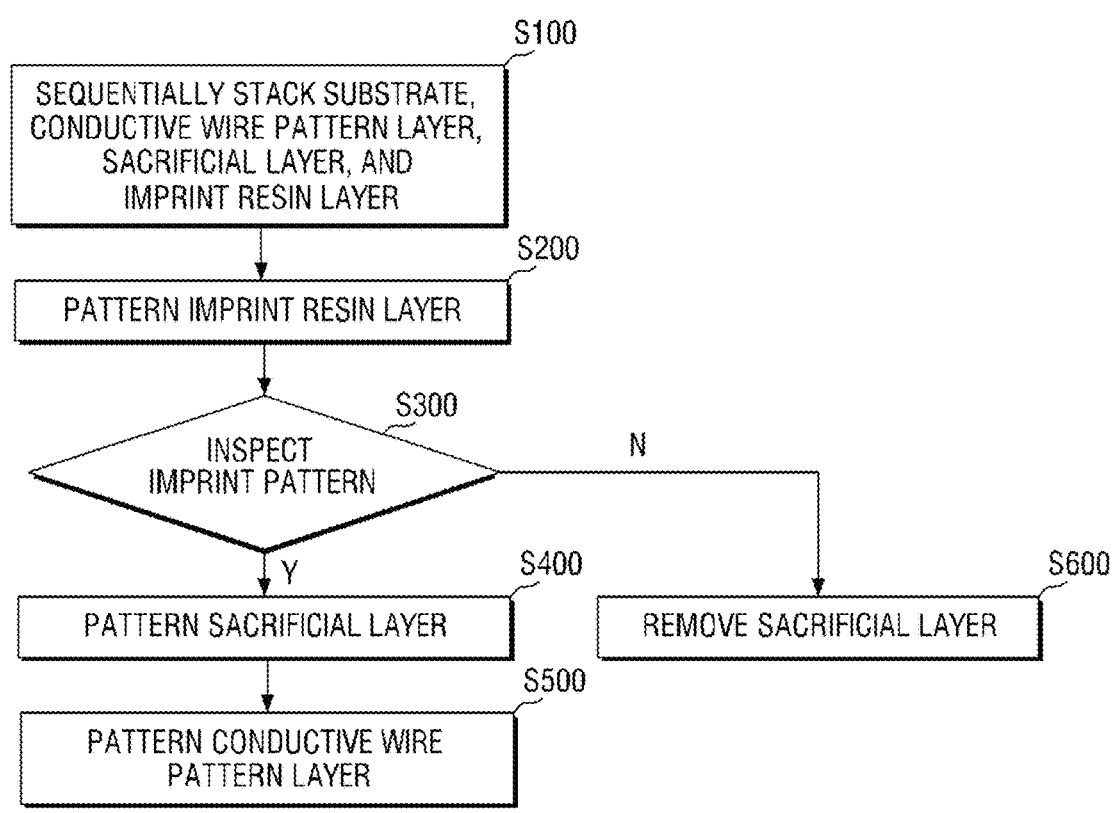
FIG. 1 is a process flowchart illustrating a method for fabricating a wire grid polarizer according to an exemplary embodiment of the present invention.
Figure 2:
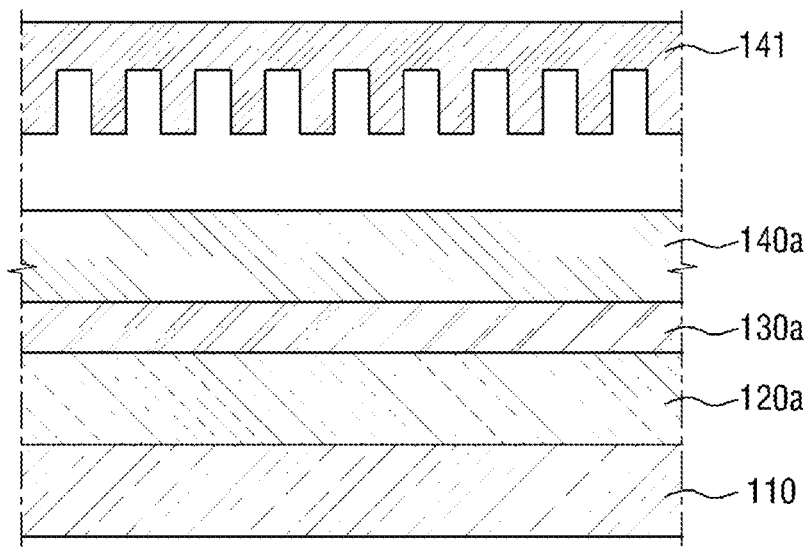
FIGS. 2 to 7 are cross-sectional views for respective processes of fabricating the wire grid polarizer according to exemplary embodiments of the present invention.
Figure 3:
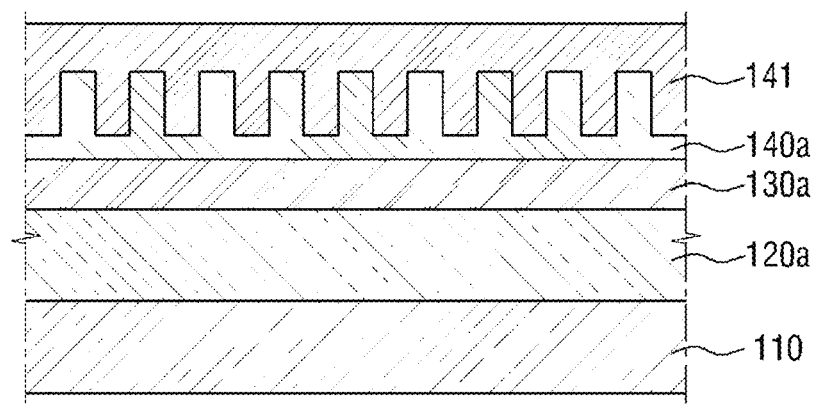
Figure 4:
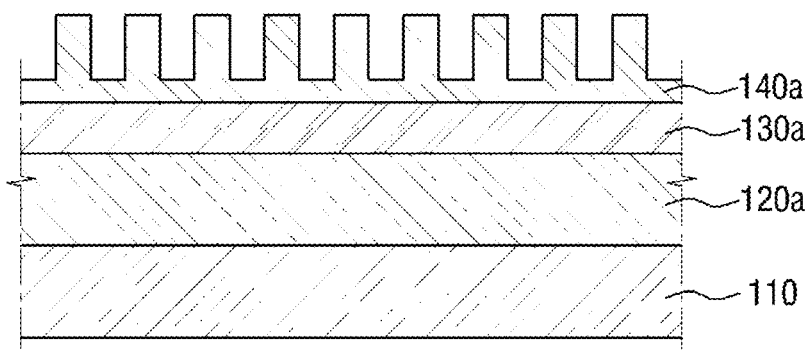
Figure 5:
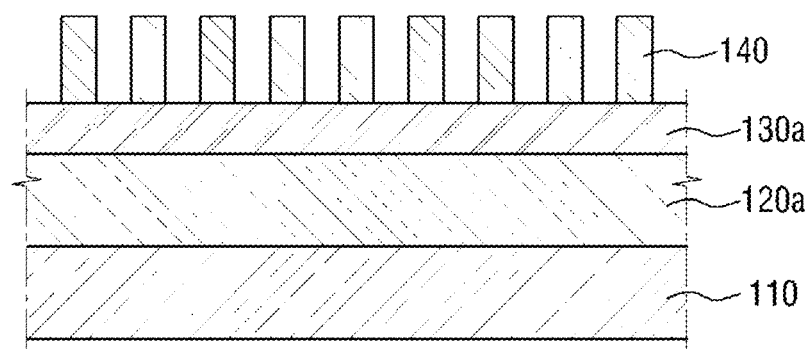
Figure 6:
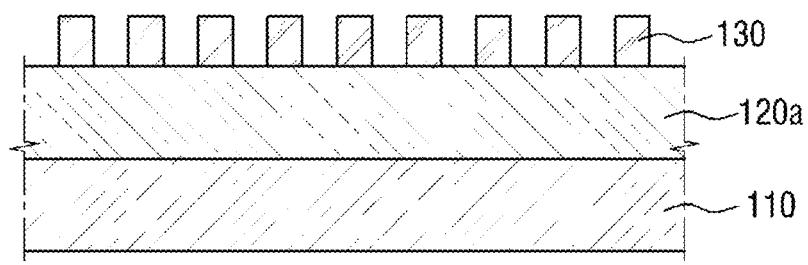
Figure 7:
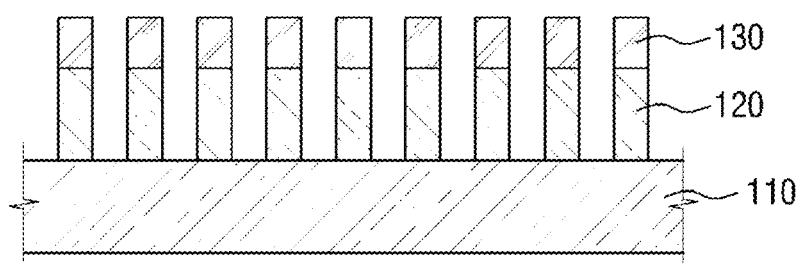

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is a process flowchart illustrating a method for fabricating a wire grid polarizer according to an exemplary embodiment of the present invention.

FIG. 1 will be described with reference to reference numerals of FIGS. 2 to 9. However, aspects of the invention are not limited thereto. The method of FIG. 1 includes an operation S100 of sequentially stacking a substrate 110, a conductive wire pattern layer 120a, a sacrificial layer 130a, and an imprint pattern layer 140a. Further, the method of FIG. 1 also includes an operation S200 of pattering the imprint pattern layer 140a, and an operation S300 of inspecting an imprint pattern 140.

The operation S200 of patterning the imprint pattern layer 140a may use a nano imprint method. However, aspects of the invention are not limited thereto, such that the respective operation may be performed by other methods, such as a method of using a guide pattern and/or a block copolymer, regardless of a name of the method.

The operation S300 of inspecting the imprint pattern 140 may determine whether the patterning has a fault or amount of defect above a reference threshold. More specifically, a determination of a presence of a fault or defects above a reference threshold may be made by inspecting the patterned imprint pattern layer 140a or the imprint pattern 140. When it is determined that the patterning has a fault or a recognizable defect, an operation S600 of removing the sacrificial layer 130a from the conductive wire pattern layer 120a may be performed to recycle the substrate 110 and the conductive wire pattern layer 120a.

When the patterning is determined to be without fault or the amount of defects is below the reference threshold, the patterning of S200 may pass the operation S300 of inspecting the imprint pattern 140. Further, it may be possible to fabricate the conductive wire grid by additionally performing an operation S400 of patterning the sacrificial layer 130a, which may use the imprint pattern 140 as a mask, and an operation 500 of patterning the conductive wire pattern layer 120a, which may use a sacrificial layer pattern 130 as a hard mask.

An operation S600 of removing the sacrificial layer 130a from the conductive wire pattern layer 120a may use wet etching or laser irradiation according to the kind of sacrificial layer 130a, but is not limited thereto.

FIGS. 2 to 7 are cross-sectional views for respective processes of fabricating the wire grid polarizer according to exemplary embodiments of the present invention.

Referring to FIGS. 2 to 7, the conductive wire pattern layer 120a, the sacrificial layer 130a, and the imprint pattern layer 140a are sequentially stacked on the substrate 110.

The conductive wire pattern layer 120a may be formed using at least one of a general sputtering method, chemical vapor deposition method, and evaporation method, and the like, but is not limited thereto.

The sacrificial layer 130a and the imprint pattern layer 140a may be applied and formed by using spin coating and the like, but are not limited thereto, and may use any usable method without limitation.

The imprint pattern layer 140a may be patterned by using an imprint mold 141.

Then, residual imprint resins are removed to form the imprint pattern 140.

Before or after removing the residual imprint resins, an operation of inspecting whether the imprint pattern 140 has a fault or amount of defects above a reference threshold may be performed.

The operation of inspecting may use a method of using mura appearing when light is flashed, a method of capturing and reading an SEM picture, and the like, but is not limited thereto, and any method capable of confirming whether the imprint pattern 140 has a fault or defects above a reference threshold may be used.

When it is determined that the imprint pattern 140 does not have a fault in the operation of inspecting, the sacrificial layer 130*a* may be etched and patterned by using the imprint pattern 140 as a mask.

The etching operation may use a patterning process, for example, a dry etching process, which is well known in the art, but is not limited thereto. Plasma gas may be used in the dry etching process, which may be appropriately selected according to a material of an etching target layer. For example, fluorogas, for example, SF6, CF4, CHF3, and C4F8, may be used as etching gas, and added gas may be used depending on a case, and O2, N2, H2, and the like may be used as the added gas, and a ratio of the added gas to the fluorogas may be a range of 0 to 5.

Conductive wire patterns 120 may be formed by etching the conductive wire pattern layer 120*a* by using the sacrificial layer pattern 130 as a hard mask.

According to aspects of the invention, a process of removing the sacrificial layer pattern 130 left on the conductive wire patterns 120 may be added. However, in a state where the sacrificial layer pattern 130 is left on the conductive wire patterns 120, the conductive wire patterns 120 may be used as the wire grid polarizer.

Although not separately illustrated in the process diagram, a protective layer may be separately formed on at least one of the conductive wire patterns 120 and the sacrificial layer pattern 130. In this case, a space between the conductive wire patterns 120 may be maintained in an empty state. Through the configuration, it may be possible to maintain polarization performance.

The protective layer may have a single layer or a stack structure. For example, the protective layer may be first formed of a material appropriate for forming the space between the conductive wire patterns 120 in a hollow structure. Further, the protective layer may be additionally formed of a material advantageous to the process. More particularly, the protective layer may have a structure in which an SiOC layer is sequentially stacked on an SiOx layer. In this case, the SiOC layer and the SiOx layer may be deposited only by a change in a raw material gas in the same chamber and condition, and a deposition speed of the SiOC layer may be relatively high, so that there is an advantage in process efficiency. However, aspects of the invention are not limited to the aforementioned configuration, and configurations may vary according to the purpose or design.

Figure 8:
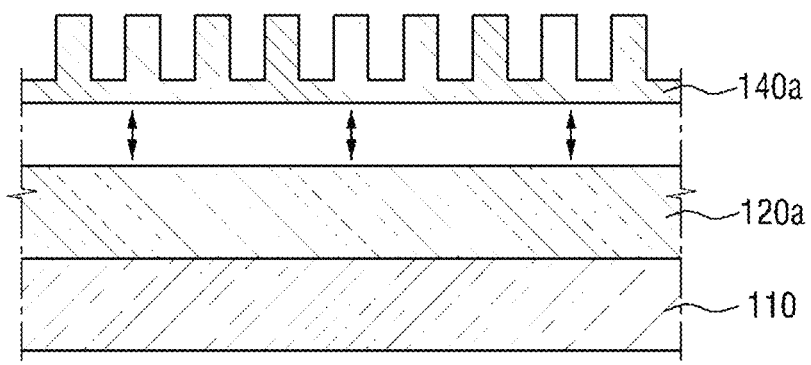
FIG. 8 is a schematic cross-sectional view of a process of removing a sacrificial layer according to an exemplary embodiment of the present invention.

FIG. 8 is a schematic cross-sectional view of a process of removing a sacrificial layer according to an exemplary embodiment of the present invention.

Referring to FIG. 8, when it is determined that the imprint pattern 140 has a fault via, for example, the operation of inspecting the imprint pattern 140, it may be possible to remove the sacrificial layer 130*a* without influencing the substrate 110 and the conductive wire pattern layer 120*a*. A material of the sacrificial layer 130*a* may, for example, be an organic material, such as polyimide or an organic-inorganic hybrid material, which may be removable by wet etching, but is not limited thereto.

The organic-inorganic hybrid material may include a ring-type organic material and an inorganic material including siloxane, for example, divinylsiloxane-benzocyclobutene, but is not limited thereto. A film may be formed through the organic material part in the hybrid material, and wet etching may be performed with an organic solvent. Further, the inorganic part may provide the sacrificial layer 130 with adhesive force for the conductive wire pattern layer 120*a* and the sacrificial layer 130 with high heat resistance. The sacrificial layer 130*a* may serve as a mask.

According to aspects of the invention, when the sacrificial layer 130*a* is formed of polyimide, the sacrificial layer 130*a* may be removed by wet etching using, for example, tetramethyl ammonium hydroxide (TMAH).

Further, when the sacrificial layer 130*a* is formed of divinylsiloxane-benzocyclobutene, the sacrificial layer 130*a* may be removed by wet etching using, for example, an organic solvent. The organic solvent may include an ammonium-based organic solvent, but aspects of the invention are not limited thereto, such that other organic solvents capable of selectively removing the sacrificial layer 130*a* may be used.

Figure 9:
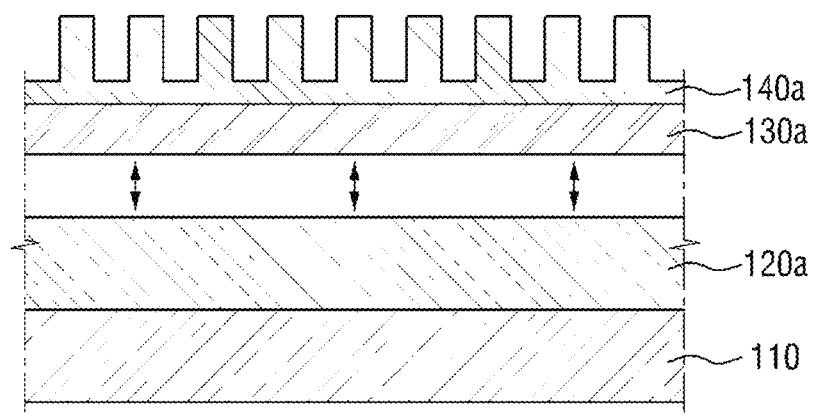
FIG. 9 is a schematic cross-sectional view of a process of removing a sacrificial layer according to an exemplary embodiment of the present invention.

FIG. 9 is a schematic cross-sectional view of a process of removing a sacrificial layer according to an exemplary embodiment of the present invention.

Referring to FIG. 9, when it is determined that the imprint pattern 140 has a fault, it may be possible to separate the sacrificial layer 130*a* from the conductive wire pattern layer 120*a* without influencing the substrate 110 and the conductive wire pattern layer 120*a*.

In this case, a material of the sacrificial layer 130*a* may, for example, be silicon. In this case, silicon of the sacrificial layer 130*a* and oxygen on a surface of the conductive wire pattern layer 120*a* may be combined with each other. When laser is radiated to the sacrificial layer 130*a* formed of silicon, silicon may be reduced to form an Si—H combination, so that the sacrificial layer 130*a* may be separated from the conductive wire pattern layer 120*a*.

The sacrificial layer 130*a* may, for example, be formed of amorphous silicon, and XeCl excimer laser may be radiated thereon as laser. In this case, the XeCl excimer laser may be absorbed in the amorphous silicon sacrificial layer 130*a* without passing through the amorphous silicon sacrificial layer 130*a*, so that it may be possible to more efficiently separate the sacrificial layer 130*a* and the conductive wire pattern layer 120*a*.

Figure 10:
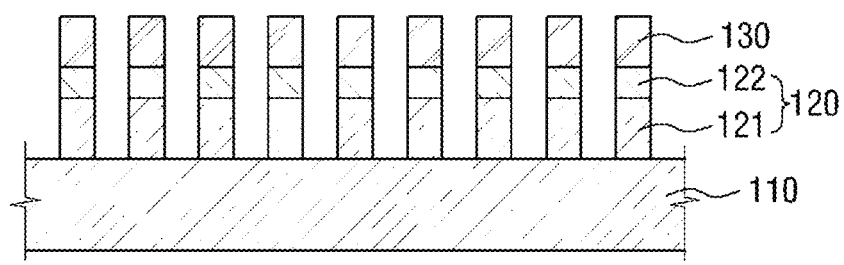
FIG. 10 is a cross-sectional view illustrating a wire grid polarizer according to an exemplary embodiment of the present invention.

FIG. 10 is a cross-sectional view illustrating the wire grid polarizer according to an exemplary embodiment of the present invention.

Referring to FIG. 10, the wire grid polarizer includes the substrate 110, the conductive wire patterns 120 disposed on the substrate 110, and the sacrificial layer pattern 130 disposed on the conductive wire pattern 120. The conductive wire patterns 120 include a first conductive wire pattern 121 and a second conductive wire pattern 122.

A material of the substrate 110 may be appropriately selected according to usage or a process as long as the substrate 110 allows visual rays to pass through. For example, the material of the substrate 110 may include various polymers, such as glass, quartz, acryl, triacetylcellulose (TAC), cyclic olefin copolymer (COC), cyclic olefin polymer (COP), polycarbonate (PC), polyethylenenaphthalate (PET), and polyethersulfone (PES), but is not limited thereto. The substrate 110 may be formed of an optical film base having a predetermined level of flexibility.

The conductive wire patterns 120 have a structure in which the first conductive wire pattern 121 and the second conductive wire pattern 122 are stacked. The conductive wire patterns 120 may be arranged in parallel on the substrate 110 at a predetermined cycle or intervals. As the period of the conductive wire patterns 120 may be shorter than a wavelength of incident light, the wire grid polarizer may have a high polarization extinction ratio. However, as the period of the conductive wire patterns 120 is shorter than the wavelength of incident light, it may be difficult to fabricate the wire grid polarizer. A visual ray region may generally be in a range of 380 nm to 780 nm, and in order for the wire grid polarizer to have a high extinction ratio for three primary colors, red, green, and blue (R, G, and B), of light, the conductive wire patterns 120 may be configured to have a period of at least 200 nm or lower so as to expect a polarization property. However, to exhibit polarization performance equal to or greater than that of an existing polarizer, the conductive wire patterns 120 may be configured to have a period of 120 nm or lower.

As long as the conductive wire pattern 120 is formed of a conductive material, the conductive wire pattern 120 may be used without limitation. According to aspects of the invention, the conductive wire pattern 120 may be formed of a metallic material, and more particularly, one metal selected from the group consisting of aluminum (Al), chrome (Cr), silver (Ag), copper (Cu), nickel (Ni), titanium (Ti), cobalt (Co), and molybdenum (Mo), or an alloy thereof, but is not limited thereto.

A width of the conductive wire pattern 120 may be in a range of 10 nm to 200 nm in which polarization performance may be exhibited, but is not limited thereto. Further, a thickness of the conductive wire pattern 120 may be in a range of 10 nm to 500 nm, but is not limited thereto.

For example, the first conductive wire pattern 121 may be formed of aluminum, and the second conductive wire pattern 122 may be formed of titanium. In this case, the second conductive wire pattern 122 may be formed on the first conductive wire pattern 121, thereby preventing or decreasing hillock of aluminum from occurring under a high temperature condition.

In FIG. 10, the conductive wire pattern 120 having a dual layer structure is disclosed, but the conductive wire pattern 120 is not limited thereto, and may have a single layer structure or a multilayer structure.

Figure 11:
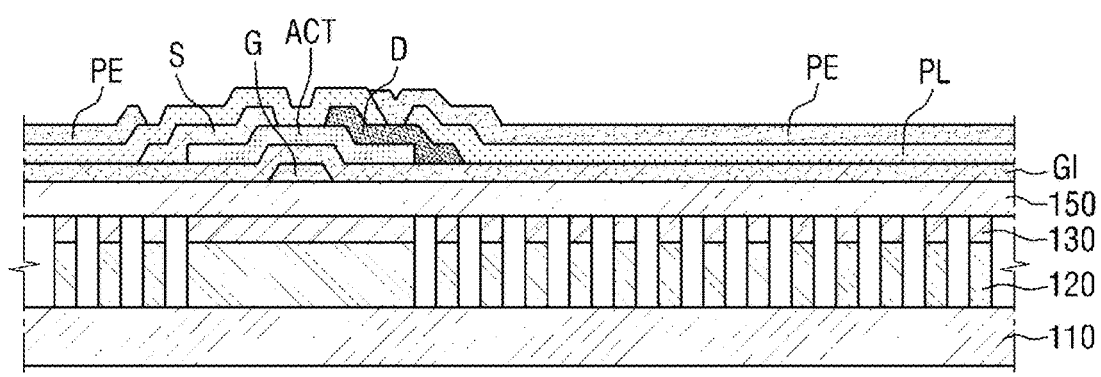
FIG. 11 is a schematic cross-sectional view of a lower panel of a display device according to an exemplary embodiment of the present invention.
Figure 12:
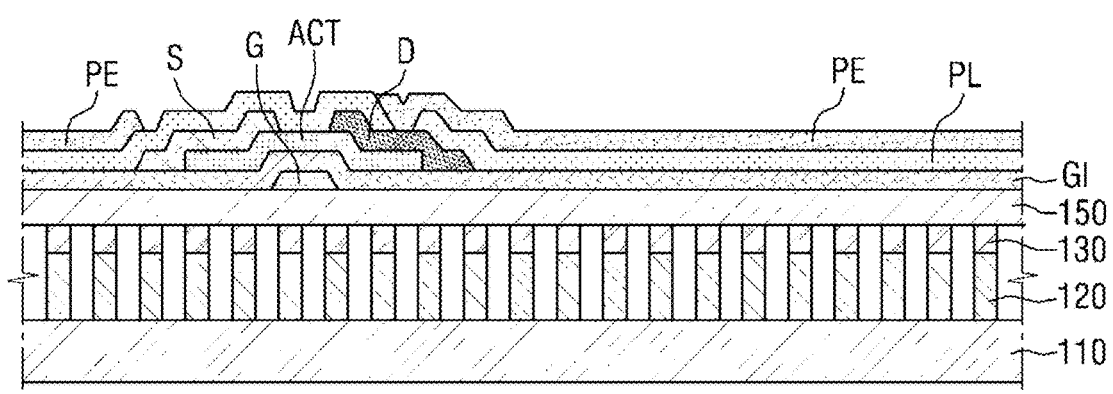
FIG. 12 is a schematic cross-sectional view of a lower panel of a display device according to an exemplary embodiment of the present invention.

FIG. 11 is a schematic cross-sectional view of a lower panel of a display device according to an exemplary embodiment of the present invention. FIG. 12 is a schematic cross-sectional view of a lower panel of a display device according to an exemplary embodiment of the present invention.

Referring to FIGS. 11 and 12, a lower substrate may be a TFT substrate. The TFT may be configured as described below. A gate electrode G is disposed on a protective layer 150, and a gate insulating layer GI is disposed on the gate electrode G and the protective layer 150. A semiconductor layer ACT is disposed in an area, in which at least a part of the semiconductor layer ACT overlaps the gate electrode G on the gate insulating layer GI. A source electrode S and a drain electrode D are disposed to be spaced apart from each other on the semiconductor layer ACT. A passivation layer PL is disposed on the gate insulating layer GI, the source electrode S, the semiconductor layer ACT, and the drain electrode D. A pixel electrode PE is disposed on the passivation layer PL through a contact hole, which may expose at least a part of the drain electrode D, to be electrically connected with the drain electrode D.

The area in which the TFT is disposed may be an area through which light does not pass, and may be referred to as a non-display area. Accordingly, at a position corresponding to the non-display area, the metallic material of the wire grid polarizer may be formed in a state where the pattern is not formed. In this case, the metallic material having high reflectivity may serve as a reflective plate, so that the metallic material may reflect light incident to the non-display area and utilize the reflected light in a display area to improve luminance of the display device.

The display device may further include a backlight unit disposed at a lower end of the lower substrate and configured to emit light. The display device may also include a liquid crystal panel including the lower substrate, a liquid crystal layer, and an upper substrate, and an upper polarizing plate positioned on the liquid crystal panel.

Further, transmission axes of the upper polarization plate and the wire grid polarizer may be orthogonal or parallel to each other. Depending on a case, the upper polarizing plate may be formed of a wire grid polarizer and may be an existing PVA-based polarization film. Further, depending on a case, the upper polarizing plate may be omitted.

Although the backlight unit is not particularly illustrated, the backlight may further include, for example, a light guide plate (LGP), a light source unit, a reflecting member, and an optical sheet.

The light guide plate may change a path of light generated by the light source unit toward the liquid crystal layer, and may have a light entering surface configured so that light generated by the light source unit is incident, and a light emitting surface facing the liquid crystal layer. The light guide plate may be formed of a material having a predetermined refractive index, such as a poly methyl methacrylate (PMMA) material or a polycarbonate (PC) material, which may be one of light transmissive materials, but is not limited thereto.

Light incident to one side or both sides of the light guide plate formed of the aforementioned material may have an angle within a threshold angle of the light guide plate, so that when the light is incident to the light guide plate and incident onto an upper surface or a lower surface of the light guide plate, an angle of the light may exceeds the threshold angle. Accordingly, the light may not be emitted to the outside of the light guide plate and may evenly be transmitted into the light guide plate.

A scattering pattern may be formed on any one surface of the upper surface and the lower surface of the light guide plate, for example, the lower surface facing the light emitting surface so that the guided light may be emitted to the upper side. For example, the scattering pattern may be printed with ink on one surface of the light guide plate so that the light transmitted into the light guide plate may be emitted to the upper side. The scattering pattern may be formed through printing with ink, but is not limited thereto, and fine recesses or protrusions may be formed on the light guide plate, and the scattering pattern may be variously modified.

The reflecting member may be further provided between the light guide plate and a bottom part of a lower accommodating member. The reflecting member may serve to reflect the light emitted to the lower surface of the light guide plate, more specifically, an opposed surface facing the light emitting surface, and provide the reflected light to the light guide plate. The reflecting member may be formed in a film type, but is not limited thereto.

The light source unit may be disposed to face the light entering surface of the light guide plate. The number of light source units may be appropriately varied as necessary. For example, one light source unit may be provided only at one lateral surface of the light guide plate, and three or more light source units may be provided so as to correspond to three or more lateral surfaces among four lateral surfaces of the light guide plate. Further, the number of light source units, which may be disposed to correspond to any one among the lateral surfaces of the light guide plate may be two or more. As described above, a side light scheme, which may be a scheme in which the light source is positioned on the lateral surface of the light guide plate, has been explained as an example, but in addition, a direct scheme, a surface-shaped light source scheme, and the like may be adopted according to a configuration of a backlight.

A light source may be a white LED for emitting white light, or a plurality of LEDs for emitting light of red (R), green (G), and blue (B), respectively. When the plurality of light sources is implemented by the LEDs for emitting light of red (R), green (G), and blue (B), respectively, it may be possible to implement white color by color mixing by simultaneously turning on the plurality of light sources.

The upper substrate may be a color filter (CF) substrate. For example, the upper substrate may include a black matrix for preventing or decreasing light leakage, color filters of red, green, and blue, and a common electrode, which may be an electric field generating electrode formed of a transparent conductive oxide, such as ITO or IZO, on a lower surface of a base formed of a transparent insulating material, such as glass or plastic.

The liquid crystal layer may serve to rotate a polarization axis of incident light, and may be aligned in a predetermined direction to be positioned between an upper substrate and a lower substrate. The liquid crystal layer may have a twisted nematic (TN) mode having dielectric anisotropy, a vertical alignment (VA) mode, or a horizontal alignment (IPS and FFS) mode, but is not limited thereto.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A wire grid polarizer, comprising:
    a substrate;
    a plurality of first conductive wire patterns on the substrate;
    a plurality of second conductive wire patterns on the first conductive patterns; and
    a plurality of sacrificial layer patterns disposed on the second conductive patterns,
    wherein the plurality of sacrificial layer patterns are formed of at least one of a polyimide, an organic-inorganic hybrid material, and silicon, and
    wherein the sidewalls of each of the plurality of first conductive patterns, the sidewalls of each of the plurality of second conductive patterns, and the sidewalls of each of the plurality of sacrificial layer patterns are aligned with each other.
2. The wire grid polarizer of claim 1, wherein the plurality of first conductive wire patterns and the plurality of second conductive wire patterns form a conductive wire pattern.
3. The wire grid polarizer of claim 2, wherein the conductive wire pattern has a structure in which a titanium layer is stacked on an aluminum layer.
4. The wire grid polarizer of claim 2, further comprising:
    a protective layer disposed on the conductive wire pattern and the sacrificial layer pattern.
5. The wire grid polarizer of claim 4, wherein the protective layer comprises a thin film transistor (TFT) layer.
6. The wire grid polarizer of claim 5, wherein the conductive wire pattern is not formed in an area corresponding to the TFT layer.
7. A display device, comprising:
    a wire grid polarizer, comprising:
        a substrate;
        a plurality of first conductive patterns disposed on the substrate;
        a plurality of second conductive patterns disposed on the plurality of first conductive patterns;
        a plurality of sacrificial layer patterns disposed on the plurality of second conductive patterns; and
        a protective layer disposed directly on the sacrificial layer patterns,
    wherein the sacrificial layer patterns are formed of at least one of a polyimide, an organic-inorganic hybrid material, and silicon, and
    the sidewalls of each of the plurality of first conductive patterns, the sidewalls of each of the plurality of second conductive patterns, and the sidewalls of each of the sacrificial layer patterns are aligned with each other.

* * * * *